(12) United States Patent
Watanabe et al.

(10) Patent No.: US 8,414,802 B2
(45) Date of Patent: Apr. 9, 2013

(54) METHOD OF MANUFACTURING POLARIZING EYEGLASS LENS

(75) Inventors: Yoshifumi Watanabe, Shinjuku-ku (JP); Eiichi Yajima, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 261 days.

(21) Appl. No.: 12/850,192

(22) Filed: Aug. 4, 2010

(65) Prior Publication Data

US 2011/0030152 A1  Feb. 10, 2011

(30) Foreign Application Priority Data

Aug. 5, 2009 (JP) ................................. 2009-182885
Jul. 26, 2010 (JP) ................................. 2010-166738

(51) Int. Cl.
   *B29D 11/00* (2006.01)
(52) U.S. Cl.
   USPC ............ 264/1.32; 264/1.7; 264/2.1; 264/2.7; 427/163.1
(58) Field of Classification Search ................. 264/1.31, 264/1.32, 1.34, 2.7, 1.1, 1.7, 2.1; 428/1.31; 427/163.1, 162
   See application file for complete search history.

(56) References Cited

U.S. PATENT DOCUMENTS

| 2,359,456 | A | | 10/1944 | Young |
| 2,398,506 | A | * | 4/1946 | Rogers ..................... 359/487.05 |
| 2,400,877 | A | | 5/1946 | Dreyer |
| 2,577,620 | A | | 12/1951 | Mahler |
| 2,603,129 | A | | 7/1952 | Dreyer |
| 4,865,668 | A | | 9/1989 | Goepfert et al. |
| 7,597,442 | B2 | | 10/2009 | Biver et al. |
| 2008/0252846 | A1 | | 10/2008 | Biver et al. |
| 2009/0274853 | A1 | * | 11/2009 | Morishima ................... 428/1.31 |

FOREIGN PATENT DOCUMENTS

| JP | 2002-527786 A | 8/2002 |
| WO | 00/22463 A1 | 4/2000 |
| WO | 2006/081006 A2 | 8/2006 |

OTHER PUBLICATIONS

European Search Report dated Nov. 24, 2010.

* cited by examiner

*Primary Examiner* — Mathieu D. Vargot
(74) *Attorney, Agent, or Firm* — Sughrue Mion, PLLC

(57) ABSTRACT

An aspect of the present invention relates to a method of manufacturing a polarizing eyeglass lens comprising forming an orientation layer on a substrate, sliding a rubbing member across the orientation layer in a state of contact with the orientation layer to form curved rubbing traces on a surface of the orientation layer, forming a polarizing layer by depositing and orienting a dichroic dye on the orientation layer, and subjecting the polarizing layer to a treatment of immobilizing the dichroic dye in the polarizing layer.

12 Claims, 9 Drawing Sheets

METHOD OF MANUFACTURING POLARIZING EYEGLASS LENS

CROSS-REFERENCE TO RELATED APPLICATIONS

This application claims the benefit of priority under 35 USC 119 to Japanese Patent Application No. 2009-182885 filed on Aug. 5, 2009 and Japanese Patent Application No. 2010-166738 filed on Jul. 26, 2010, which are expressly incorporated herein by reference in their entirety.

BACKGROUND OF THE INVENTION

1. Field of the Invention

The present invention relates to a method of manufacturing a polarizing eyeglass lens functioning to absorb or transmit light of a specific direction of polarization for the purpose of blocking light such as reflected light having a specific direction of polarization outdoors or the like.

2. Discussion of the Background

A variety of polarizing elements that pass or block only those components of incident light that are polarized in specific directions have come into use. For example, in optical pickups, there are glass elements that comprise multilayered films and diffraction gratings comprised of organic birefringent materials. Dichroic polarizing elements are employed in display devices such as liquid-crystal displays (LCDs) to increase contrast. They are manufactured by the method of tinting a film with a dichroic material such as iodine, crosslinking the film with a crosslinking agent, and uniaxially extending the film.

Further, polarizing elements can be manufactured by the method of coating a dichroic dye on an orientation layer on a substrate. This method utilizes the fact that water-soluble dichroic dyes exhibit liquid crystal properties based on concentration when dissolved in an aqueous solvent. When a coating material containing dichroic dyes exhibiting liquid crystal properties is coated on an orientation layer, uniform orientation of the liquid crystals is achieved and the dichroic dye in the coating film is uniaxially oriented. A thin film containing uniaxially oriented dichroic dye can be used as a polarizing element to achieve a polarizing function.

As an example of a method of manufacturing a polarizing element employing an orientation layer, WO2006/081006, which is expressly incorporated herein by reference in its entirety, discloses providing an orientation layer in the form of an inorganic intermediate layer between a transparent substrate and a polarizing layer in a polarizing product having a polarizing layer and a protective layer on the surface of a transparent substrate. WO2006/081006 describes that the inorganic intermediate layer functions to strengthen adhesion between the polarizing layer and the substrate, and that silica ($SiO_2$) is suitable as a material for forming the inorganic intermediate layer.

Polarizing elements are used in manufactured products in addition to the above electronic devices and the like. For example, US2008/0252846A1 and Family member U.S. Pat. No. 7,597,442, which are expressly incorporated herein by reference in their entirety, propose a polarizing eyeglass lens incorporating a polarizing filter.

A description of polarization will be given. Based on Brewster's law, light reflecting off of a flat surface is known to contain a large s-polarization component in a direction of polarization perpendicular to the plane of incidence (the plane containing the normal to the position of incidence and the direction of incidence). Accordingly, when natural light reflects off of the vertical reflective surface of a building, most of the light that reflects is polarized in a direction that is perpendicular to the plane of incidence, that is, polarized in a direction parallel to the surface of the building, and spreads out. In US2008/0252846A1, the lens is divided into several zones and a polarizing filter with a different direction of polarization axis is provided in each zone to protect the eye of the wearer of the lens from the glare of reflected light. US2008/0252846A1 also discloses a method of manufacturing a polarizing lens comprising a customizing step of distinguishing between a type of lens wearer who moves the eyes themselves while exploring the environment and a type of lens wearer who moves his head, and varying the size of the zones on that basis.

The polarizing lens that is proposed in US2008/0252846A1 envisions vertically polarized light entering the lens from a direction precisely horizontal to the user, and horizontally polarized light entering from above. However, light becomes vertically polarized when it reflects off of the lateral surfaces of buildings and the like when the sun is low, such as at dawn and dusk. Horizontally polarized light from above strikes the wearer when the wearer and the position of the sun are aligned in a direction that is perpendicular to the surface of reflection.

Such conditions are for the most part special conditions. In the course of a day, natural sunlight mostly shines down on the surface of the earth from diagonally above the wearer (including both front and rear). Accordingly, when such light reflects off of building glass, panels, and the like, most of the reflected light enters the lens from diagonally above. That is, most of the reflected light that enters an eyeglass lens is light that has been polarized in diagonal directions that are different from the reference line direction (horizontal direction) and the meridian direction of the lens.

Thus, the polarizing lens of US2008/0252846A1 is incapable of fully blocking diagonally polarized light that enters from such diagonal directions. Most such light ends up being passed. Further, the daily living environment is comprised not just of smooth reflective surfaces such as building glass and panels, but also of the curved, glossy surfaces of vehicles and the like. The polarizing lens of US2008/0252846A1 cannot block the light containing complex directions of polarization that is reflected off of such surfaces.

When the directions of polarization axes are varied in each zone, the directions of polarization of the light that can be blocked are limited, numerous variations must be prepared based on use by the wearer, and difficulty is to be anticipated in responding to the needs of customers. Further, it is inconvenient for the wearer to carry all of these variations around with him and change out the lenses as needed. Thus, this is not a desirable polarizing lens.

SUMMARY OF THE INVENTION

An aspect of the present invention provides for a method of manufacturing a polarizing eyeglass lens that can block light having different directions of polarization that enters from various directions.

An aspect of the present invention relates to a method of manufacturing a polarizing eyeglass lens (also referred to as simply a "polarizing lens" hereinafter) comprising:

forming an orientation layer on a substrate;

sliding a rubbing member across the orientation layer in a state of contact with the orientation layer to form curved rubbing traces on a surface of the orientation layer;

forming a polarizing layer by depositing and orienting a dichroic dye on the orientation layer; and subjecting the polarizing layer to a treatment of immobilizing the dichroic dye in the polarizing layer. In the step of forming rubbing traces on the orientation layer, the curved rubbing traces need not be formed over the entire surface of the orientation layer. It is possible to form rubbing traces having one portion that is linear in shape, and it suffices to form rubbing traces being at least partly curved.

In the step of forming curved rubbing traces, one of the rubbing member and the substrate can be secured and the other of the two can be slid using a displacement reference at a given position as a center of revolution with the rubbing member in a state of contact with the orientation layer.

In such an embodiment of the present invention, either the substrate or the rubbing member imparting rubbing traces to the surface of the orientation layer is moved in revolving fashion about a displacement reference at a given position, and slid by means of equidistant movement to form rubbing traces. That is, in one embodiment of the present invention, curved rubbing traces such as arcs or concentric circles can be formed by the above-described sliding on the surface of the orientation layer, and a dichroic dye can be deposited and oriented on the orientation layer having rubbing traces to form a polarizing layer at least a portion of polarization axes of which are curved. When the displacement reference is set somewhere other than on the substrate in this embodiment, arc-shaped rubbing traces can be formed on the surface of the orientation layer by revolving either the substrate or the rubbing member. Additionally, when the displacement reference is positioned on the substrate, rubbing traces in the form of concentric circles centered on the displacement reference can be formed on the surface of the orientation layer.

The step of forming curved rubbing traces can be conducted by relatively displacing (including linear displacement) either the rubbing member or the substrate in different directions (for example, two or more directions) by sliding with the rubbing member in a state of contact with the orientation layer. For example, either the rubbing member or the substrate can be secured, and the other of the two can be displaced in two different directions by biaxial actuator or the like. Alternatively, one of the two can be uniaxially displaced in linear fashion, and the other can be linearly displayed in a perpendicular direction, for example, to form rubbing traces in the form of arcs or concentric circles.

A coating liquid containing a dichroic dye can be coated on the surface of the orientation layer on which have been formed curved rubbing traces in the form of arcs, concentric circles, or the like, to foam a polarizing layer having curved polarization axes along the rubbing traces. The directions of the curved polarization axes change continuously, so light of various polarization directions can be blocked based on the changes in the directions of polarization axes.

In particular, when the displacement reference is set on the substrate to form rubbing traces, it is possible to form polarization axes that are closed curves in the form of concentric circles. Thus, it becomes possible to handle reflected light entering from any direction over a 360 degree range.

In the present invention, a polarizing layer can be formed in which the directions of polarization axes vary continuously, making it possible to provide a polarizing eyeglass lens that is capable of blocking light with different directions of polarization entering from various directions.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein.

DETAILED DESCRIPTION OF THE EMBODIMENTS

Figure 1:
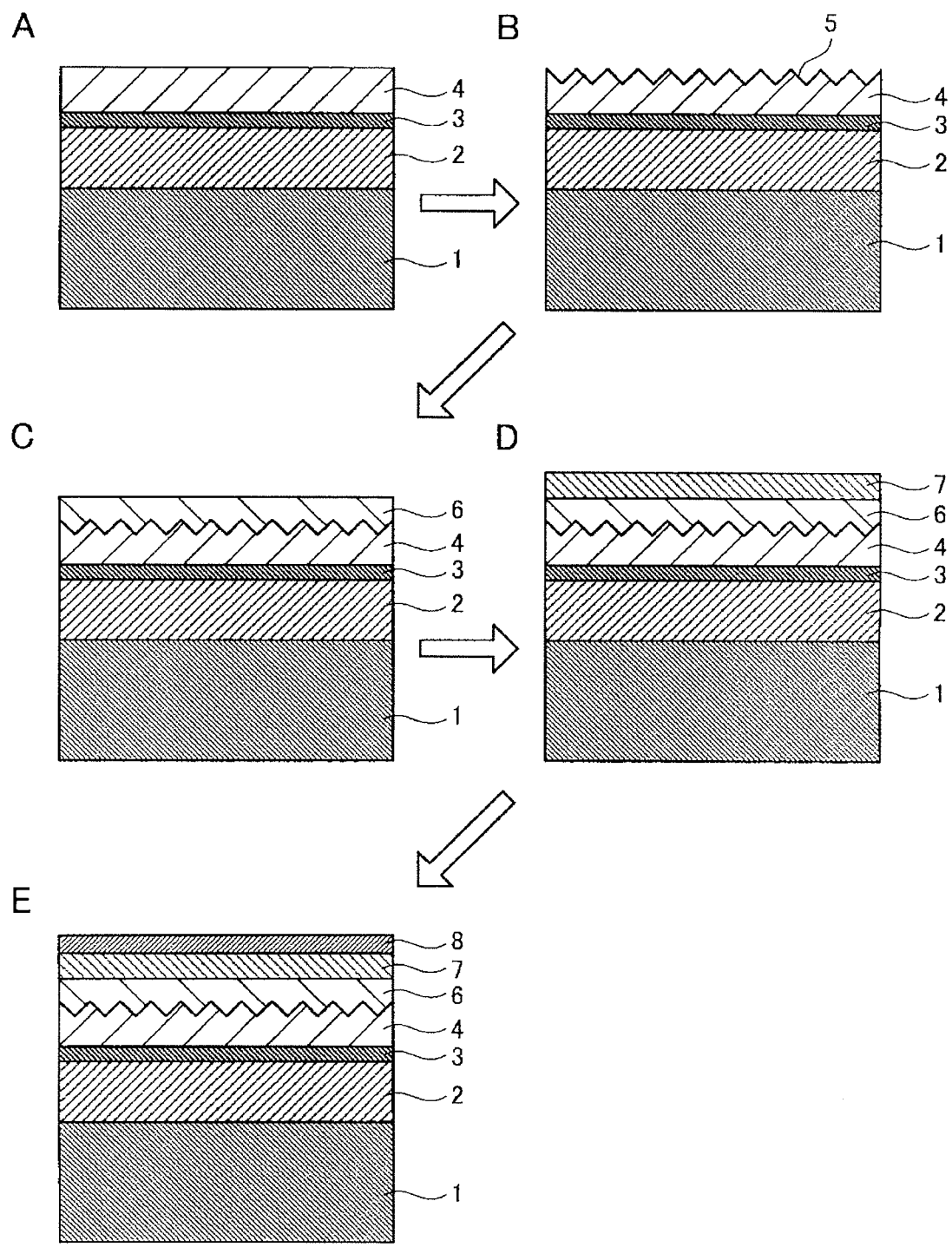
FIGS. 1A to E are step diagrams showing the method of manufacturing a polarizing lens of the present invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Embodiments of the implementation modes of the present invention will be described below. However, the present invention is not limited by the embodiments given below. The description will be given in the following order.
1. Configuration of polarizing lens material
2. Manufacturing steps other than the rubbing trace forming step
3. First implementation mode (mode of forming arc-shaped rubbing traces)
   (3-1) Basic example
   (3-2) First modification example
   (3-3) Second modification example
   (3-4) Third modification example
4. Second implementation mode (mode of forming closed curve rubbing traces)
5. Third implementation mode (mode of relatively displacing substrate and rubbing member in two directions)
6. Examples of rubbing trace-forming devices
   (6-1) Example of device forming arc-shaped rubbing traces
   (6-2) Example of device forming concentric circular rubbing traces 1. Configuration of Polarizing Lens Material The polarizing lens that is manufactured by the present invention is an eyeglass lens that is formed by forming a primer layer to enhance adhesion and impact resistance as needed on a substrate comprised of a transparent material such as plastic or glass, and forming a hard coat layer thereover as needed. As needed, a new primer layer can be formed thereover, an orientation layer can be formed on the primer layer, and a dichroic dye can be deposited and oriented thereover to sequentially provide a polarizing layer. Further, functional films such as an antireflective layer and, as needed, a water repellent film can be formed.

The substrate employed in the polarizing lens is not specifically limited; examples are plastic and inorganic glass. Examples of plastics are methyl methacrylate homopolymer, copolymers of methyl methacrylate and one or more other monomers, diethylene glycol bisallyl carbonate homopolymer, copolymers of diethylene glycol bisallyl carbonate and one or more other monomers, iodine-containing copolymers, halogen copolymers, polycarbonates, polystyrenes, polyvinyl chloride, unsaturated polyester, polyethylene terephthalate, polyurethanes, polythiourethanes, polymers made from materials including epithio group-containing compounds, homopolymers of monomers having sulfide bonds, copolymers of a sulfide and one or more other monomers, copolymers of a polysulfide and one or more other monomers, and copolymers of a polysulfide and one or more other monomers.

A substrate of meniscus or convex lens shape can be employed as the above substrate. The outer surface shape of the substrate is not specifically limited; it can be of any shape, such as flat, concave, or convex. The a prescribed number of diopters of correction can be imparted to the substrate, or it can be a lens substrate without correction.

The orientation layer that is formed on the substrate is provided for the oriented deposition of a dichroic dye. Silicon oxide, metal oxides, and complexes thereof can be employed as the orientation layer. Examples are oxides of materials selected from among Si, Al, Zr, Ti, Ge, Sn, In, Zn, Sb, Ta, Nb, V, and Y; and complexes and compounds of these materials. Of these, SiO and $SiO_2$ are particularly suited to use. The orientation layer can be formed by a film-forming step, such as vapor deposition, from these materials. The film thickness of the orientation layer need only be adequate to permit the formation of rubbing traces suitable for imparting a polarizing function to the polarizing layer formed thereover. When thicker than needed, the time required for vapor deposition time ends up becoming excessive. From these perspectives, the thickness of the orientation layer can be, for example, equal to or greater than 85 nm but equal to or less than 500 nm.

An organic compound-containing material can be used as the material constituting the orientation layer so long as it has a certain degree of adhesiveness to the substrate and the direction of polarization axes in the polarizing layer above it can be readily specified. For example, the orientation layer can be formed by the sol-gel method with an organic material. In that case, the material employed is not specifically limited. Examples of desirable orientation layers that are formed of organic materials are sol-gel films formed using materials containing an inorganic oxide sol and at least the alkoxysilane denoted by general formula (1) below or the hexaalkoxydisiloxane denoted by general formula (2) below, and further containing, as needed, the functional group-containing alkoxysilane denoted by general formula (3) below. It is not necessary for both the alkoxysilane and the hexaalkoxydisiloxane to be contained; only one need be incorporated.

$$Si(OR^1)_a(R^2)_{4-a} \quad (1)$$

$$(R^3O)_3Si-O-Si(OR^4)_3 \quad (2)$$

$$R^5-Si(OR^6)_b(R^7)_{3-b} \quad (3)$$

In the above formulas, each of $R^1$ in general formula (1) above and $R^3$ and $R^4$ in general formula (2) above independently denotes a linear, branched, or cyclic alkyl group having 1 to 5 carbon atoms, such as a methyl group, ethyl group, n-propyl group, isopropyl group, n-butyl group, isobutyl group, sec-butyl group, tert-butyl group, pentyl group, or cyclopentyl group. Of these, a methyl group or ethyl group is desirable.

In general formula (1), $R^2$ denotes an alkyl group with 1 to 10 carbon atoms. Examples are the above alkyl group having 1 to 5 carbon atoms, a hexyl group, a heptyl group, an octyl group, and a 2-ethylhexyl group. Of these, a methyl group, ethyl group, propyl group, or butyl group is desirable. In general formula (1), a denotes 3 or 4.

In general formula (3), $R^5$ denotes an organic group having one or more functional groups selected from the group consisting of glycidoxy groups, epoxy group, amino groups, and isocyanate groups; each of $R^6$ and $R^7$ independently denotes an alkyl group having 1 to 5 carbon atoms and b denotes 2 or 3.

The polarizing layer in the present invention can contain one or more dichroic dye. In the present invention, the term "dichroic" means properties in which the color of transmitted light is different depending on the direction of propagation due to the presence of anisotropy in the medium in the selective absorption of light. Dichroic dyes have the properties of intensified polarized light absorption in a specific direction of dye molecules, and diminished light absorption in a direction perpendicular to the above direction. Among dichroic dyes, when water is employed as solvent, some are known to exhibit liquid crystal states at certain concentration and temperature ranges. Such liquid crystal states are referred to as lyotropic liquid crystals. By utilizing the liquid crystal states of these dichroic dyes to cause the dye molecules to array themselves in a single specified direction, it is possible to achieve more intense dichroism.

The dichroic dye employed in the present invention is not specifically limited. Dichroic dyes that are known to be employed in common polarizing elements can be used in the present invention. Examples are azo, anthraquinone, merocyanine, styryl, azomethine, quinone, quinophthalone, perylene, indigo, tetrazine, stilbene, and benzidine dies. The dyes described in U.S. Pat. No. 2,400,877 and Published Japanese Translation (TOKUHYO) No. 2002-527786 of a PCT International Application, which are expressly incorporated herein by reference in their entirety, are further examples.

In the polarizing lens obtained by the present invention, an orientation layer is formed on the substrate. The orientation layer can be directly laminated on the substrate, or a hard coat layer or primer layer can be present between the substrate and the orientation layer. In this case, the material of the hard coat layer is not specifically limited. A coating composition comprised of a known organic silicon compound and inorganic oxide colloid particles can be employed.

From the perspective of enhancing adhesion, various known resins such as polyurethane can be employed in the primer layer.

2. Manufacturing Steps Other than the Rubbing Trace Forming Step

Manufacturing steps that are common to all of implementation modes of the invention will be described next with reference to the step diagrams of FIG. 1.

The method of manufacturing a polarizing lens of the present invention desirably comprises steps 1 to 4 below.

In step 1, an orientation layer is formed on the substrate. As set forth above, prior to step 1, it is possible to add the step of forming a hard coat layer or primer layer.

In step 2, a rubbing member is contacted with and rubbed against the orientation layer to form curved rubbing traces. This step will be described in detail further below.

In step 3, a dichroic dye is deposited and oriented to form a polarizing layer on the orientation layer on which rubbing traces have been formed.

In step 4, the polarizing layer that has been formed on the orientation layer is treated to immobilize the dichroic dye within it. The immobilization treatment can be in the form of forming a protective layer on the polarizing layer. As is set forth further below, the protective layer is normally a layer that is integrated with the polarizing layer. Subsequently, as needed, a step of forming a functional film such as an antireflective film or a water-repellent film can be added.

FIGS. 1A to 1E show the steps in the method of forming a polarizing lens comprising steps 1 to 4 above.

First, in step 1, as shown in FIG. 1A, hard coat layer 2 and primer layer 3 are formed as needed on substrate 1, followed by the formation of orientation layer 4. Examples of the method of forming hard coat layer 2 on the substrate are the methods used to coat the above coating composition on the substrate. Commonly employed methods such as dipping, spin coating, and spraying can be employed as the coating means. From the perspective of surface precision, dipping and spin coating are preferred.

Primer layer 3 can also be coated by the same method.

The adhesiveness or the like of hard coat layer 2 or primer layer 3 to substrate 1 can be enhanced by subjecting the surface of the substrate to a chemical treatment with an acid, alkali, or any of various organic solvents; a physical treatment such as plasma or UV radiation; treatment with a cleaning agent; sandblasting; or primer processing with various resins prior to coating these layers. When neither hard coat layer 2 nor primer layer 3 is provided, the adhesiveness of the orientation layer 4 that is formed thereon can be enhanced.

When orientation layer 4 is formed using the above-described silicon oxides, metal oxides, or complexes or compounds thereof, it can be formed by vapor deposition or the like. When the orientation layer is formed as the above-described sol-gel film, it can be formed by spin coating or the like a coating liquid containing the above compound. The solvents used to prepare the coating liquid, the catalysts used to promote a hydrolysis reaction, and the like are not specifically limited; any solvent, catalyst, or the like that does not create problems in the subsequent step of forming rubbing traces can be employed.

The coating liquid can be spin coated or the like on substrate 1 and then thermoprocessed to form a sol-gel film. The thickness of the sol-gel film is, for example, 0.02 to 5 micrometers, desirably 0.05 to 0.5 micrometer. When the thickness is equal to or greater than 0.02 micrometer, overall film separation can be prevented in the subsequent formation of rubbing traces and the sol-gel film that is formed can function as an orientation layer. When equal to or less than 5 micrometers, cracking can be reduced.

The coating and thermoprocessing conditions are not specifically limited. It suffices to employ conditions that allow the formation of an orientation film of uniform thickness that permits the formation of a polarizing film capable of imparting a good light-blocking effect, and an orientation layer having good surface smoothness. Desirable examples of such coating conditions are, in the case of spin coating, a spin coating rotational speed of 200 to 2,000 rpm and a processing time of 0.5 to 3 minutes. Thermoprocessing conditions of 50 to 120° C. for 0.5 to 3 hours are desirable.

As set forth above, orientation layer 4 can be a thin film formed by the vapor deposition of an inorganic substance such as the above-described $SiO_2$, or the above-described sol-gel film. Since thin films formed of inorganic substances are relatively hard, processing such as using an abrasive with an average particle diameter of equal to or greater than 2 micrometers is sometimes required. In such cases, the rubbing traces become coarse, and clouding and the like sometimes appear.

Since a sol-gel film is normally not as hard as a thin film formed of an inorganic substance, fine rubbing traces can be readily formed with an abrasive with an average particle diameter of less than 2 micrometers, for example. Further, abrasives of finer particles can be employed when incorporating the materials of general formulas (1) to (3). Thus, when conducting curved shape processing such as that set forth further below, finer processing is possible. For example, even when the contact pressure reaches locally high levels and when the rubbing member is slid in a concentrated fashion at one spot, the generation of clouding due to processing marks (rubbing scratches) can be prevented. Accordingly, the generation of defective products can be reduced, the yield can be enhanced, and cost decreases can be achieved.

Since the use of elaborate vacuum deposition equipment that is required to form a layer comprised of an inorganic substance such as $SiO_2$ is unnecessary in the formation of sol-gel films, the complexity of manufacturing operations can be eliminated and manufacturing steps can be simplified.

In step 2 as shown in FIG. 1B, orientation layer 4 that has been formed by step 1 is subjected to the formation of curved rubbing traces such as arcs and concentric circles by the method set forth further below, thereby forming curved rubbing traces 5. The rubbing traces are desirably formed with an abrasive to align to some degree the width and depth of rubbing traces 5. Rubbing traces 5 are not limited to the saw-toothed sectional shape shown in the example of the figure. Any sectional shape that is aligned to such a degree that variation does not occur in the polarizing effect will do.

In the manufacturing of liquid-crystal displays (LCDs), the rubbing of an orientation film (polyimide or the like) that is being held on a substrate in one direction in a rubbing step to orient the liquid crystals within the cells is well known. The technique of coating a liquid containing a dichroic dye on a substrate that has been polished in a single direction, orienting the dye, and exploiting its dichroism is disclosed in, for example, U.S. Pat. Nos. 2,400,877 and 4,865,668, which are expressly incorporated herein by reference in their entirety.

In the present invention, in the same manner as for liquid crystals in the manufacturing of liquid-crystal displays (LCDs), a rubbing member can be slid over an orientation layer (such as the sol-gel film set forth above) formed on a substrate, or the substrate can be slid, to form rubbing traces that are capable of orienting a dichroic dye in a specific direction.

The abrasive employed to form the rubbing traces is not specifically limited. For example, a slurry containing abrasive particles that has been impregnated with a foam material such as urethane foam can be employed. Examples of the abrasive particles are $Al_2O_3$, $ZrO_2$, and $TiO_2$. Of these, $Al_2O_3$ is desirable from the perspectives of hardness (ease, finishing) with respect to orientation film 4 that is formed and chemical stability. One type of particle can be employed alone, or two or more can be combined for use. Viscosity-modifying agents, pH-adjusting agents, and the like can be incorporated into the slurry containing the abrasive particles.

The average particle diameter of the abrasive particles is desirably less than 7 micrometers, preferably 0.05 to 6.7 micrometers, and more preferably, 1.5 to 3.0 micrometers, to form fine rubbing traces.

The processing conditions are not specifically limited. The rotational speed, contact pressure, processing time, and the like can be suitably adjusted. Since no great change in polarizing effect is achieved by employing a large number of rubbings, a number of rubbings of about one or more will suffice.

In step 3 as shown in FIG. 1C, polarizing layer 6 is formed by depositing and orienting a dichroic dye on orientation layer 4 having curved rubbing traces 5 formed in step 2. Prior to forming polarizing layer 6, the surface of the orientation layer that has been processed is desirably thoroughly cleaned and dried. Next, an aqueous solution or suspension (desirably an aqueous solution) containing a dichroic dye is coated on orientation layer 4 having rubbing traces 5. Preferably, the dichroic dye is treated to render it insoluble in water, thereby completing polarizing layer 6.

The method used to coat the dichroic dye is not specifically limited. Examples are known methods such as spin coating, dip coating, flow coating, and spray coating.

Dyes and the like other than those set forth above can be blended into the aqueous solution or suspension containing the dichroic dye, to the extent that the effect of the present invention is not lost, to manufacture a polarizing eyeglass lens of desired hue, for example. Further, from the perspective of enhancing coating properties, additives such as rheology-enhancing agents, adhesion-promoting agents, plasticizers, and leveling agents can be blended in as needed.

The method of immersing the dichroic dye that has been coated on the orientation layer in a metal salt aqueous solution is desirable as a treatment to render the dye insoluble in water. The metal salt employed is not specifically limited; examples are $AlCl_3$, $BaCl_2$, $CdCl_2$, $ZnCl_2$, $FeCl_2$, and $SnCl_3$. Of these, from the perspective of safety, $AlCl_3$ and $ZnCl_2$ are desirable. Following the treatment to render the dye insoluble in water, the dichroic dye-containing layer surface can be dried again.

The thickness of the polarizing layer is not specifically limited. A range of 0.05 to 0.5 micrometer is desirable to achieve the targeted good polarizing effect (blocking effect on unwanted light).

As set forth above, when a coating material containing a dichroic dye exhibiting liquid crystal properties is coated on orientation layer 4, the orientation direction of the liquid crystals is rendered uniform along rubbing traces 5 formed on orientation layer 4 and the dichroic dye is uniaxially oriented within the coating film. Forming an orientation structure of dichroic dye in this manner permits the formation of polarizing layer 6 having polarization axes along rubbing traces 5. There are dichroic dyes that orient themselves perpendicular to the direction of rubbing traces 5 and dichroic dyes that orient themselves parallel to the direction of rubbing traces 5. Either of these dichroic dyes may be employed in the present invention. When forming a distribution of arcs and concentric circles in the direction of polarization, the use of a material having the property of orienting in parallel to the rubbing traces is preferred.

In step 4, the polarizing layer that has been formed on the orientation layer is treated to immobilize the dichroic dye in the layer. In this step, as shown in FIG. 1D, protective layer 7 can be formed to immobilize the dye on polarizing layer 6 foamed in step 3. Subsequently, as shown in FIG. 1E, functional film 8 such as a water-repellent film, can be formed on protective layer 7 as needed.

Organic silicon compounds are examples of the material employed to form protective layer 7. For example, a liquid containing an organic silicon compound can be coated by a known method such as dipping, spin coating, or spraying, and then cured with heat to form protective film 7 on polarizing layer 6. In this process, the organic silicon compound impregnates polarizing layer 6, forming a layer that essentially integrates protective layer 7 and polarizing layer 6. The thickness of the integrated layer of protective layer 7 and polarizing layer 6 is not specifically limited, and desirably falls within a range of 0.05 to 1 micrometer.

Further, a functional film, such as a hard coat film that increases resistance to scratching, an antireflective film, a water-repellent film, a UV-absorbing film, an infrared-absorbing film, a photochromic film, or an antistatic film can be formed by a known method on the polarizing eyeglass lens obtained by the above steps.

For example, neither the material nor the method used to form an antireflective film is specifically limited. An antireflective film consisting of a single layer or multilayered film of known inorganic oxides can be formed. Examples of such inorganic oxides are silicon dioxide ($SiO_2$), zirconium oxide ($ZrO_2$), aluminum oxide ($Al_2O_3$), niobium oxide ($Nb_2O_5$), and yttrium oxide ($Y_2O_3$).

3. First Implementation Mode (Mode of Forming Circular Arc-Shaped Rubbing Traces)

(3-1) Basic Example

The step of forming the rubbing traces in above-described step 2 in the method of manufacturing a polarizing lens relating to a first implementation mode will be described next in detail.

Figure 2:
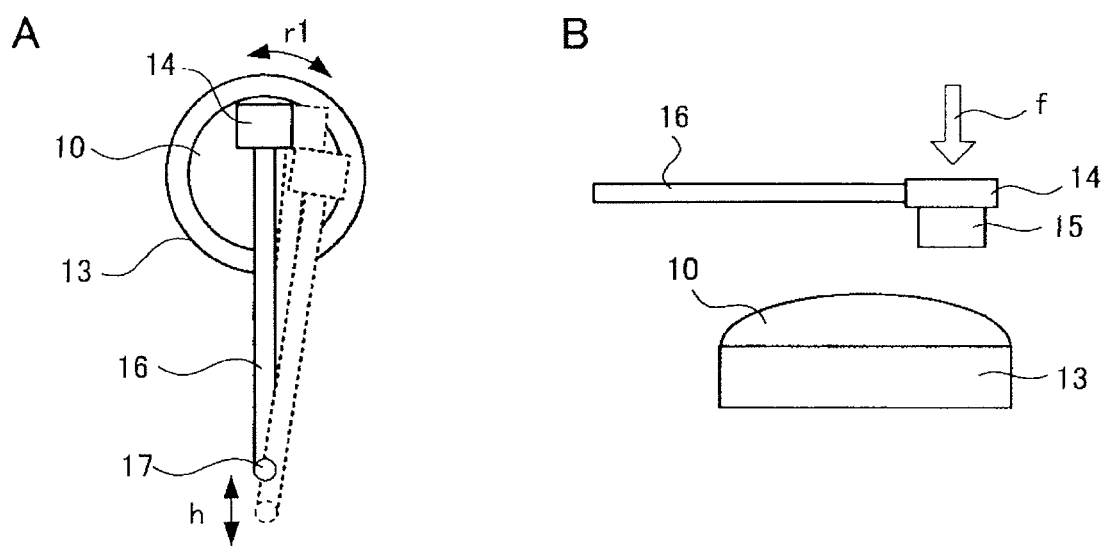
FIG. 2 is comprised of drawings showing steps in the formation of rubbing traces in the method of manufacturing a polarizing lens relating to a first implementation mode of the present invention; A is a top view and B is a lateral view.

FIG. 2 is comprised of drawings showing the steps of forming rubbing traces in the present implementation mode. FIG. 2A is a top view during processing, and FIG. 2B is a lateral view. In the example given here, the substrate is secured, and the rubbing member is revolved about a displacement reference and specifically moved in arcs.

As shown in FIG. 2A, substrate 10 on which has been formed an orientation layer (not shown) is positioned and secured on jig 13 with the surface on the orientation layer side facing upward.

Next, rubbing head 14 is positioned above substrate 1. Head 14 is secured to one end of a rod-shaped shaft, for example. A position a prescribed distance from head 14 (the other end of shaft 16) serves as displacement reference 17. At displacement reference 17, shaft 16 is supported by a column (not shown) or the like in a manner permitting revolution about the center, as indicated by arrow r1 in FIG. 2A. Rubbing member 15 is mounted as shown in FIG. 2B on the bottom portion of head 14. An elastic member such as a sponge, rubber, or packing can be employed as rubbing member 15, making it possible for the rubbing member to follow the various surface contours of substrate 10, such as convex and concave surfaces.

The example shown in FIG. 2 is one in which displacement reference 17 of shaft 16 is positioned away from the geometric center of substrate 10 and to the outside of substrate 10. Thus, rubbing member 15 moves back and forth in revolving fashion (swings) while tracing an arc-shaped path on the surface of substrate 10. Contacting rubbing member 15 with the surface of the orientation layer on substrate 10 and applying pressure against substrate 10 as indicated by arrow f in FIG. 2B as needed to cause revolution motion forms arc-shaped rubbing traces on the orientation layer. Further, in this process, the above-described mixture of abrasive and solvent (pure water, oily solvent, or a mixture of pure water, additives, and the like) can be employed as a slurry. Instead of a slurry, dry processing can be conducted with a sheet impregnated with an abrasive such as $Al_2O_3$. Alternatively, rubbing traces can be formed by wet processing by supplying pure water, oil, or the like as needed.

When rubbing member 15 is smaller in size than the substrate, that is, when it is necessary to slide different regions on the surface of substrate 10, it suffices to linearly displace displacement reference 17 of shaft 16 in the lengthwise direction of shaft 16 as indicated by arrow h in FIG. 2A, and then conduct the same revolution displacement to form arc-shaped rubbing traces. Repeating this process can form rubbing traces over the entire outer surface of substrate 10.

Further, it is similarly possible to form rubbing traces at other positions on substrate 10 by displacing substrate 10 without changing the position of shaft 16.

Further, for example, more complex free curves can be traced by connecting shaft 16 to a numeric control device (NC) or the like at displacement reference 17, and displacing head 14 by revolution while linearly displacing it in the direction of extension of shaft 16, for example. In a configuration in which the length of shaft 16 from head 14 to displacement reference 17 is made variable, the radius of revolution displacement can be changed to any size, making it possible to form rubbing traces in which the radius of curvature is varied. In that case, depending on the area in which rubbing traces are formed and the desired curvature of the rubbing traces, displacement reference 17 can be positioned on substrate 10.

In one desirable embodiment, displacement reference 17 of shaft 16 is positioned vertically beneath the geometric center of the substrate when the lens is being worn. Setting the displacement reference in this manner makes it possible to form rubbing traces in which the peaks of the arcs face vertically upward when the lens is being worn. Conversely, when displacement reference 17 of shaft 16 is positioned vertically above the geometric center of the substrate when the lens is being worn, it becomes possible to form rubbing traces in which the peaks of the arcs face vertically downward when the lens is being worn. Unless specifically stated otherwise, positions and directions on the substrate and on the lens mean positions and directions when the lens is being worn in the present invention.

In particular, when displacement reference 17 is positioned on a vertical line running through the geometric center of the substrate, the positions of the vertices of the arcs also align vertically. The geometric center of the substrate is the geometric center of the polarizing lens that is obtained. In the present invention, the geometric center of a lens is the optical center of a polarizing lens that is a single-focus lens, and the prism measurement reference point of a progressive dioptric power lens.

Figure 3:
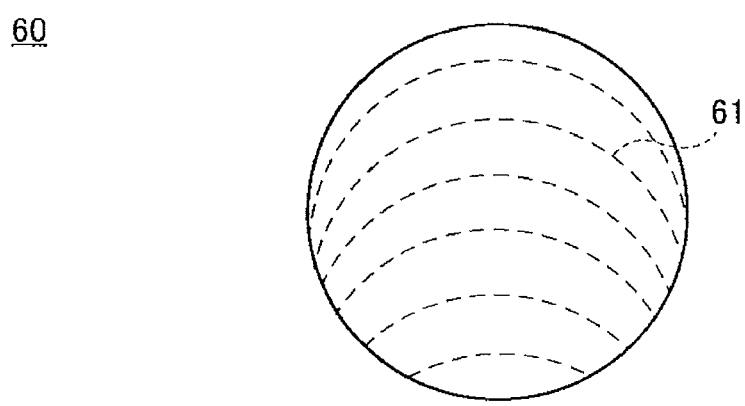
FIG. 3 is a plan view of an example of polarization axes of a polarizing lens manufactured by the method of manufacturing a polarizing lens relating to the first implementation mode of the present invention.
Figure 4:
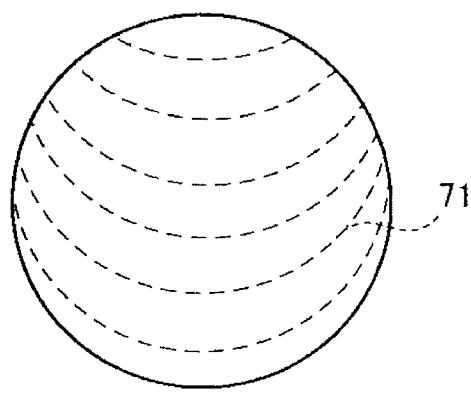
FIG. 4 is a plan view showing another example of polarization axes of a polarizing lens manufactured by the method of manufacturing a polarizing lens relating to the first implementation mode of the present invention.

FIGS. 3 and 4 show an example of a polarizing lens manufactured in this manner. In polarizing lens 60 shown in FIG. 3, a polarizing layer having upward-facing, convex, arc-shaped polarization axes 61 is present on the surface. In this case, the center of the circle forming the arc lies vertically beneath, and within the surface of the lens, it is possible to form polarization axes (absorption axes) that can respond to upward changes in the direction of the line of sight due to revolution or rotation of the eyeball. Accordingly, in the polarizing lens manufactured by the method of the present implementation mode, light reflecting off of vertical or horizontal surfaces that enters from in front of the wearer can be blocked well because polarization axes (that is, absorption axes) are formed along the direction of polarization of the above-described light in the front region of the lens. Additionally, as set forth above, light entering in diagonally upward directions along the outer walls and the like of buildings as set forth above is diagonally polarized. Such diagonally polarized light can be also blocked well because the direction of polarization axes is rendered diagonal in the diagonal upper right and upper left regions by forming polarization axes of the lens in an arc shape. In the present invention, the term "direction of polarization axis" refers to the tangential direction with regard to a polarization axis that is curved. The polarizing layer normally contains two or more multiple polarization axes, but the number and spacing thereof is not specifically limited and can be set based on the desired polarization function. The multiple polarization axes within a single surface are normally arranged in parallel, but it suffices to align the directions so that they do not intersect, and they need not be completely parallel.

FIG. 4 is a drawing showing an example of a polarizing lens in which, in the step described in FIG. 2, the rubbing traces are formed with displacement reference 17 positioned vertically above the geometric center of the substrate when the lens is being worn. In this case, vertically downward facing, convex, arc-shaped polarization axes 71 are formed in polarizing lens 70. In lens 70, light that has been polarized in a diagonal direction that enters in a diagonally downward direction can be blocked because polarization axes (absorption axes) that are capable of responding to downward changes in the direction of the line of sight due to revolution or rotation of the eyeball can be formed in the lens surface. In this case, a polarizing lens can be provided that is capable of blocking polarized light from the surface of water when the sun is shining from directly ahead to a diagonal direction of the wearer near water, for example.

In the polarizing lens described in above-cited US2008/0252846A1, the direction of polarization axes is changed in each zone. Thus, when the eyeball crosses such a boundary and revolves, a sudden glare occurs or objects grow dark. There is a risk of ending up creating an unnatural field of view. In contrast, the manufacturing method of the present invention can produce a polarizing lens in which the direction of polarization axes changes continuously, making it possible to achieve a good, natural field of view. Further, having the direction of polarization axes change continuously makes it possible to handle light that is polarized in various directions.

As shown in FIGS. 2A and B, forming rubbing traces by displacing rubbing member 15 about displacement reference 17 as a center makes it possible to form continuous curves without producing run out in the arcs. In this context, the term "continuous" desirably means having smooth continuity such that the second derivative becomes a constant when the curve is denoted as a function. However, in this context, the term "continuous" need only mean continuous on a scale that is visibly recognizable to the human eye, and need not mean continuous on a microscopic scale, such as the size of a molecule. Further, for example, when both a region in which polarization axes are linear and a region in which polarization axes are curved are incorporated, the connecting portion desirably changes smoothly. In the example shown in FIG. 2 as set forth above, linear displacement in addition to revolution displacement about displacement reference 17 as a center makes it possible to form adequately smooth rubbing traces.

(3-2) First Modification Example

Figure 5:
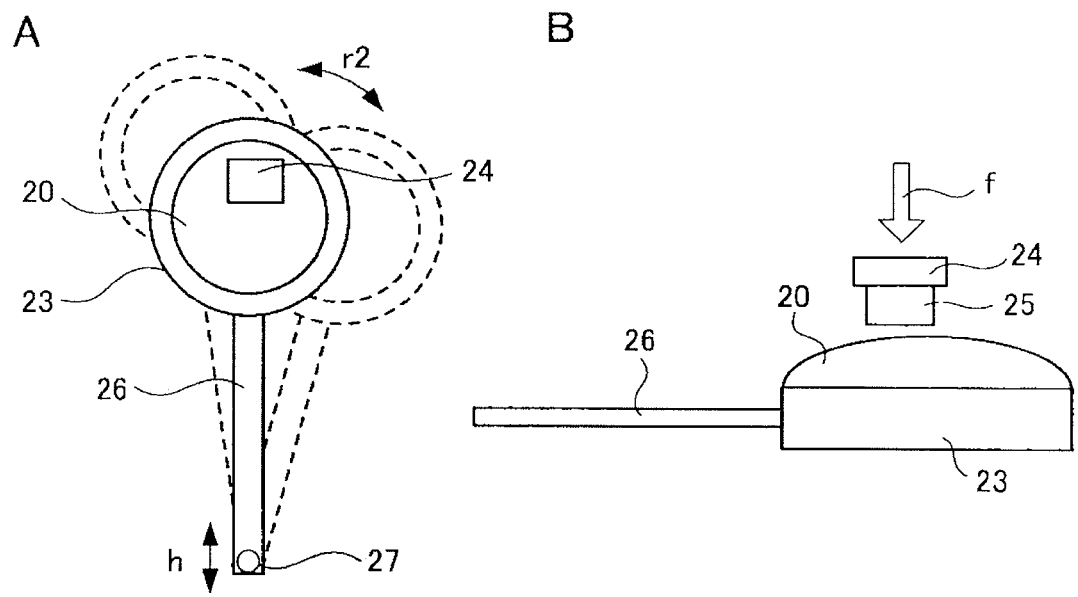
FIG. 5 is comprised of drawings showing steps in the formation of rubbing traces in a first modification example of a method of manufacturing a polarizing lens relating to the first implementation mode of the present invention; A is a top view and B is a lateral view.

This is an example in which the rubbing member is secured and the substrate is displaced by revolution. FIG. 5 is a drawing showing the steps of forming rubbing traces in this example. FIG. 5A is a top view when forming rubbing traces, and FIG. 5B is a side view. In the present modification example, in addition to the steps of forming rubbing traces described using FIG. 5, it is also possible to manufacture polarizing lenses by the same steps as those shown in above-described FIG. 1.

As shown in FIG. 5A, in the present example, rubbing head 24 is secured. Substrate 20 is secured on jig 23 with the side on which the orientation layer (not shown) is formed facing upward. Rod-shaped shaft 26 is connected to jig 23. Displacement reference 27 is provided at a position at some distance from jig 23 on shaft 26, and is secured by a support member, not shown. As shown in FIG. 5B, rubbing member 25 is mounted to the bottom of head 24. Rubbing member 25 is comprised of an elastic member such as a sponge, rubber, or packing, making it possible to form rubbing traces that follow the surface contours of substrate 20. Shaft 26 is displaced by revolution at some radius about displacement substrate 27 as a center so that the front end of jig 23 is displaced by revolution in the manner indicated by arrow r2, thereby displacing substrate 20 by revolution. In this state, rubbing member 25 is contacted with the surface of the orientation layer on substrate 20, and is pressed against it with a prescribed pressure as indicated by arrow f in FIG. 5B to form arc-shaped rubbing traces on the orientation layer.

During this process, a mixture of the above-described abrasive and solvent prepared in the same manner as in the above-described basic example is desirably fed as a slurry. In the present modification example, instead of a slurry, an $Al_2O_3$-impregnated sheet can be used in dry processing, or pure water or oil can be fed in wet processing.

When rubbing member 25 is slid over different regions on substrate 20, either the position of head 24 is changed, or displacement reference 27 of shaft 26 is displaced in the direction of extension thereof, as indicated by arrow h in FIG. 5A. Further, the distance from jig 23 to displacement reference 27 can be changed to alter the radius of the arc-shaped rubbing traces and conduct processing over the entire surface of substrate 20. In this case, as well, it is possible to continuously form more complex curved rubbing traces by linearly displacing shaft 26 while displacing jig 23 by revolution about displacement reference 27.

In this example, as well, the same effect as above can be achieved by positioning displacement reference 27 of shaft 26 vertically beneath the geometric center of the substrate when the lens is being worn or, conversely, positioning displacement reference 27 of shaft 26 vertically above the geometric center of the substrate when the lens is being worn. Further, in the same manner as set forth above, the positions of the vertices of the arcs of the rubbing traces can be aligned in a vertical direction by positioning displacement reference 27 on a vertical line passing through the geometric center of the substrate.

Thus, in the present modification example, as well, coating a coating liquid containing a dichroic dye on an orientation layer that is formed with arc-shaped rubbing traces makes it possible to form a polarizing layer in which the directions of polarization axes change continuously in an arc shape. Accordingly, a polarizing lens manufactured by the method of the present modification example makes it possible to block reflected light that is diagonally polarized and enters diagonally from directions above and below the wearer. It is also possible to achieve the effect of blocking reflected light entering from directly ahead by vertically aligning the positions of the vertices of the arcs.

(3-3) Second Modification Example

In the present modification example, a surface plate is employed instead of securing a rubbing member to the head. The surface plate is rotated as a rubbing member to form rubbing traces on the orientation layer on the substrate. Except for the step of forming the rubbing traces, manufacturing can be conducted by the same manufacturing steps as those described with reference to FIG. 1 in the present modification example.

Figure 6:
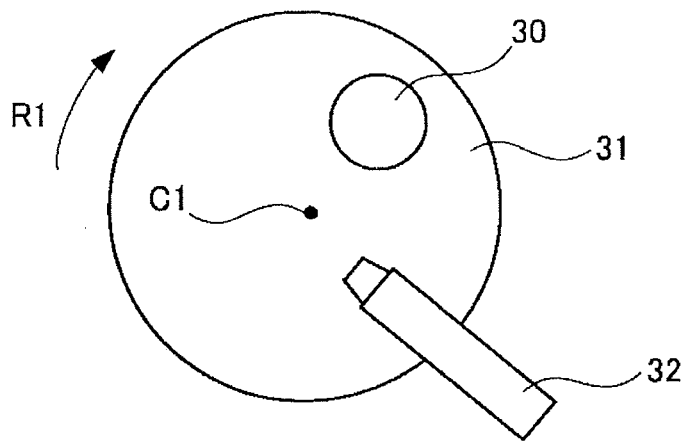
FIG. 6 is a drawing showing the step of forming rubbing traces in a second modification example of a method of manufacturing a polarizing lens relating to the first implementation mode of the present invention.

FIG. 6 is a top view showing the step of forming rubbing traces in the present example. As shown in FIG. 6, on surface plate 31 of any desired size, for example, on a circular surface plate, substrate 30 on which has been formed an orientation layer is secured to a separate support (not shown) so as not to rotate with surface plate 31 and so that the surface of the orientation layer faces surface plate 31 side as the sliding surface. It is positioned away from the center of surface plate 31.

An elastic member such as a sponge, rubber, or packing is desirably mounted on the surface of surface plate 31 that contacts substrate 30 so as to follow the contours of the sliding surface of substrate 30. A mixed slurry of abrasive and solvent is fed from slurry feeding member 32, and surface plate 31 is rotated in the direction of arrow R1 about displacement reference C1 as a center. Displacement reference C1 is positioned, for example, in the center of surface plate 31. In this example, it is also possible to conduct dry processing in which an abrasive sheet or the like is provided on the surface of surface plate 31 without feeding a slurry, or to form rubbing traces by wet processing in which pure water or oil is fed.

Thus, the surface of the orientation layer comprised of a sol-gel film, an $SiO_2$ film, or the like formed on substrate 30 is rubbed. However, in the present modification example, displacement reference C1 is positioned away from substrate 30, permitting the formation of arc-shaped rubbing traces on the orientation layer on substrate 30. The same abrasives and solvents may be employed as in the above-described basic example.

Further, the manner of fixing substrate 30 is not specifically limited. However, it is desirable to secure substrate 30 at some distance from displacement reference C1 of surface plate 31 so that arc-shaped rubbing traces of desired radius can be formed.

In the second modification example, positioning substrate 30 so that displacement reference C1 of surface plate 31 is vertically beneath when the lens is worn results in the formation of arc-shaped rubbing traces that protrude vertically upward. Conversely, positioning substrate 30 so that displacement reference C1 of surface plate 31 is vertically above when the lens is worn results in the formation of an orientation layer with arc-shaped rubbing traces that face vertically downward. These polarizing lenses can be configured to have the same light-blocking functions as the examples described using FIGS. 3 and 4 above.

Similarly, in the present modification example, light with various directions of polarization that enters from various directions can be blocked because it is possible to form a polarizing layer in which the direction of polarization axes changes continuously.

(3-4) Third Modification Example

In the present modification example, a surface plate is secured and the substrate is displaced by revolution with a displacement reference positioned away from the substrate as the center axis to conduct processing and form an orientation layer provided with arc-shaped rubbing traces. Except for the step of forming the rubbing traces that is described using FIG. 7, manufacturing can be conducted as in the other modification examples by the same manufacturing steps as those described with reference to FIG. 1.

Figure 7:
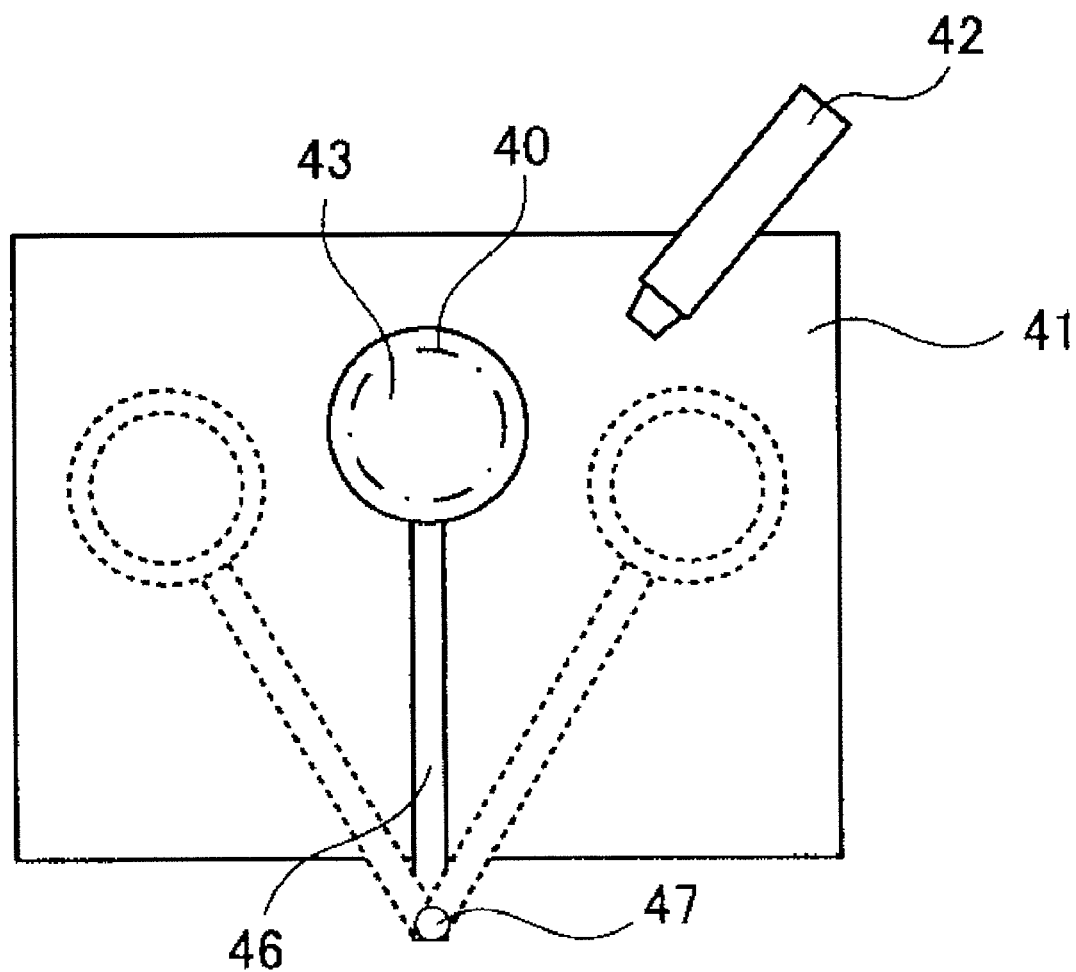
FIG. 7 is a drawing showing the step of forming rubbing traces in a third modification example of a method of manufacturing a polarizing lens relating to the first implementation mode of the present invention.

FIG. 7 is a top view of the steps of forming rubbing traces in the present modification example. Substrate 40 on which has been formed an orientation layer comprised of a sol-gel film, an $SiO_2$ layer, or the like is secured to jig 43 with the side on which the orientation layer has been formed facing surface plate 41. Rod-shaped shaft 46, for example, is connected to jig 43, and substrate 40 is displaced by revolution about displacement reference 47 as the center axis. The surface of surface plate 41 on substrate 40 side is desirably configured with an elastic member such as a sponge, rubber, or packing, allowing it to follow the surface contours of substrate 40.

Slurry feeding member 42 feeds a mixed slurry of abrasive and solvent, and substrate 40 is displaced by revolution about displacement reference 47 as the center axis while an adequate pressure is applied as needed to substrate 40 to bring it into contact with surface plate 41. This causes substrate 40 to slide across surface plate 41, tracing arc-shaped paths. In this example, it is also possible to form rubbing traces, without feeding a slurry, by dry processing in which an abrasive sheet is provided on the surface of surface plate 41, or by wet processing by feeding pure water or an oil. This permits the formation of arc-shaped rubbing traces on the orientation layer of substrate 40. Accordingly, a polarizing layer having arc-shaped polarization axes along the rubbing traces can be formed by coating a coating liquid containing a dichroic dye on the orientation layer.

In the present modification example, as well, disposing substrate 40 so that displacement reference 47 is positioned vertically below when the lens is worn makes it possible to manufacture a polarizing lens in which the arc-shaped polarization axes are vertically upwardly convex when worn. Conversely, disposing substrate 40 so that displacement reference 47 is positioned vertically above when the lens is worn makes it possible to manufacture a polarizing lens in which the arc-shaped polarization axes are vertically downwardly convex when worn. In this case, as well, the same light-blocking effect can be achieved as in the example described for FIGS. 3 and 4.

Thus, forming a polarizing layer in which the directions of polarization axes change continuously in a arc-shaped manner permits the polarizing lens provided with this polarizing layer to block light of various directions of polarization. Since the directions of polarization axes change continuously, the brightness within the field of view changes naturally, and a good field of view can be achieved.

4. Second Implementation Mode (Mode of Forming Closed-Curve Rubbing Traces)

The method of manufacturing a polarizing lens based on the present implementation mode is that of positioning the displacement reference on the substrate. Forming closed-curve rubbing traces on the orientation layer in this manner and depositing and orienting a dichroic dye thereover permit the formation of a polarizing layer provided with closed-curve polarization axes. With the exception of the step of forming the rubbing traces, manufacturing can be conducted by the same steps and methods as in the first implementation mode.

Figure 8:
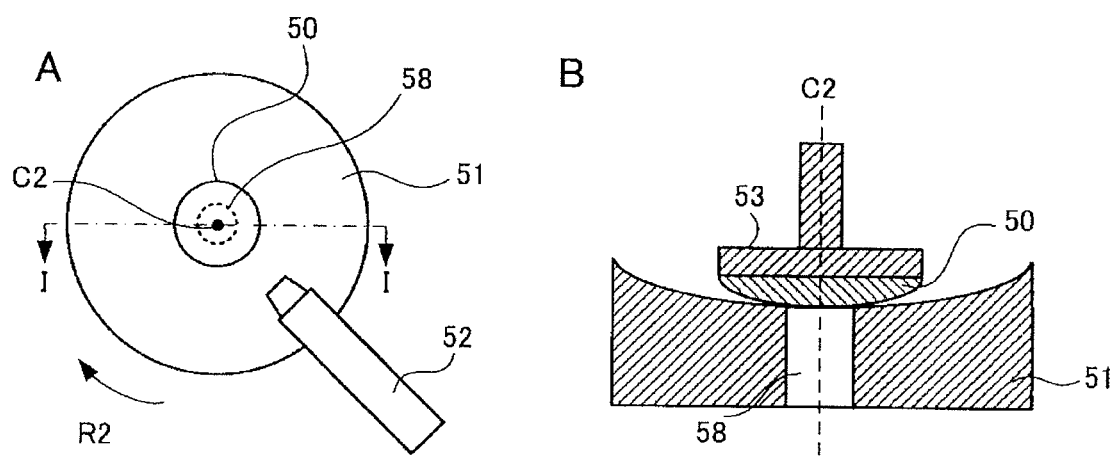
FIG. 8 is comprised of drawings showing steps in the formation of rubbing traces in a method of manufacturing a polarizing lens relating to a second implementation mode of the present invention; A is a top view and B is a sectional view along section line I-I in FIG. 8A.

FIG. 8 is comprised of drawings showing the steps of forming rubbing traces in the present implementation mode. FIG. 8A is a top view during the formation of rubbing traces and FIG. 8B is a sectional view along section line I-I of FIG. 8A.

As shown by FIG. 8A, a surface plate 51 is rotated in the direction of arrow R2 about displacement reference C2 as a center. Displacement reference C2 is, for example, a rotating shaft disposed in the center of surface plate 51. FIG. 8B shows a transverse section of displacement reference C2 in FIG. 8A. Hole 58, for example, having a circular shape in a planar view, is provided in surface plate 51, passing through surface plate 51 with displacement reference C2 at its center. Substrate 50, on which is formed an orientation layer in the form of a sol-gel film or an $SiO_2$ film, is secured on jig 53 facing surface plate 51 side so that the surface of the orientation layer becomes the sliding surface. As shown in FIG. 8B, the substrate is positioned in this process so that the position of the displacement reference C2 of surface plate 51 faces the sliding surface of substrate 50. The geometric center of the substrate, that is, the geometric center of the eyeglass lens (the optical center in the case of a single-focus lens and the prism reference measurement point or the like in the case of a progressive dioptric power lens) is desirably roughly matched with displacement reference C2.

Slurry feeding member 52 shown in FIG. 8A then feeds a mixed slurry of abrasive and solvent, and jig 53, on which surface plate 51 or substrate 50 is secured, is rotated with displacement reference C2 as the center axis while contacting substrate 50 with surface plate 51 with some pressure. In this example, as well, the surface of surface plate 51 on the substrate 50 side is desirably comprised of an elastic member such as a sponge, rubber, or packing to follow the surface contours of substrate 50.

The surface of the orientation layer on substrate 50 is thus rubbed. In this case, closed-curve rubbing traces in the form of concentric circles are formed. No rubbing traces are formed in the region of the surface of the orientation layer that is positioned on hole 58 of surface plate 51. When there is an abrupt change in the direction of polarization near the center of the field of view in a polarizing eyeglass lens, a change of considerable brightness will sometimes tend to strike the eyes, causing the wearer to experience discomfort. To avoid such situations, polarization axes are desirably not positioned in the region containing the geometric center of the substrate, that is, the geometric center of the eyeglass lens (the optical center in the case of a single-focus lens and the prism reference measurement point or the like in the case of a progressive dioptric power lens). To obtain a polarizing lens without polarization axes in the center portion in this manner, it is desirable to provide a region (non-contact region) in which there is no contact between the surface of the orientation layer and the rubbing member in the center portion containing the geometric center of the substrate during the step of forming the rubbing traces. For example, the above-described surface plate having a hole in its center can be used to provide a region in which there is no contact (non-contact region) between the surface of the orientation layer and the rubbing member. In the embodiment shown in FIG. 8, a non-contact region can be formed in the center portion (in the vicinity of the displacement reference) containing displacement reference C2.

The non-contact region can be a circular region, for example. The diameter is desirably equal to or greater than 4 mm to achieve a good wearing sensation. However, the larger this region, the smaller the region performing a polarizing function. Thus, from the perspective of obtaining a polarizing lens with a good polarizing function, the diameter of this region is desirably equal to or less than 15 mm. That is, in the polarizing lens that is formed, the region with a diameter of 4 to 15 mm containing the geometric center desirably contains no polarization axes. In the embodiment shown in FIG. 8, the diameter of hole 58 corresponds to the diameter of the non-contact region, so the diameter is desirably 4 to 15 mm.

Figure 9:
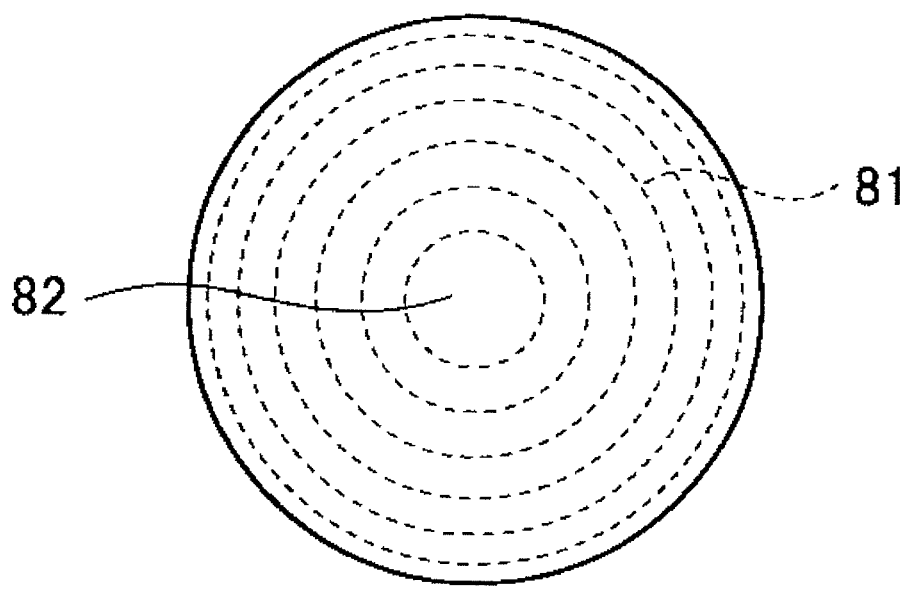
FIG. 9 is a plan view showing an example of polarization axes of a polarizing lens manufactured by the method of manufacturing a polarizing lens relating to the second implementation mode of the invention.

After conducting the step of forming rubbing traces as shown in FIG. 8, a coating liquid containing a dichroic dye can be coated on the orientation layer and the dye can be oriented along the rubbing traces to form polarizing lens 80 provided with a polarizing layer having concentric circular polarization axes 81 such as that shown in FIG. 9.

The method of the present implementation mode permits the manufacturing of a polarizing lens having closed-curve polarization axes in the area surrounding the geometric center of the lens, for example, the optical center, in which the directions of polarization axes vary continuously. The polarizing lens thus obtained can block polarized light entering from any direction over a range of 360 degrees.

Further, since no rubbing traces are formed in the region that is not contacted with surface plate 51 due to hole 58 in surface plate 51, this portion becomes non-polarizing region 82 without polarization axes.

In the present implementation mode, the displacement reference is set on the surface plate serving as the rubbing member and the surface plate or the substrate is rotated about the displacement reference as a center. However, a polarizing lens having concentric circular polarization axes can be similarly obtained by rotating the substrate about a displacement reference as a center that is set on the substrate.

5. Third Implementation Mode (an Example in which at Least the Substrate or the Rubbing Member is Relatively Displaced in Two Directions)

In the method of manufacturing a polarizing lens based on the present implementation mode, at least one of the substrate and the rubbing member is displaced relatively in two directions to slide the surface of the orientation layer and form rubbing traces. With the exception of the method of forming the rubbing traces described below, polarizing lenses can be manufactured by the method described for the first implementation mode.

Figure 10:
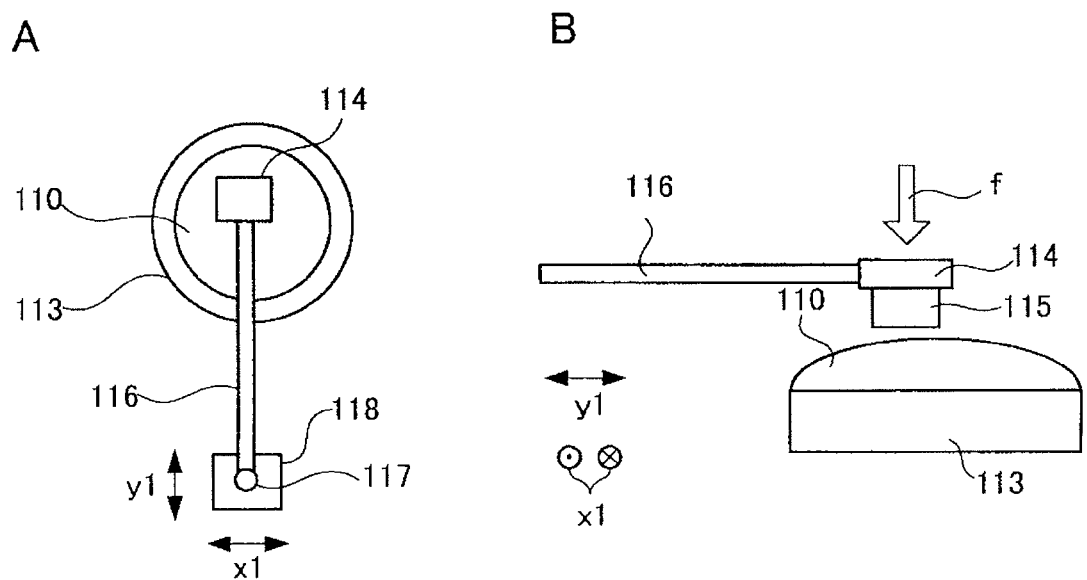
FIG. 10 is comprised of drawings showing steps in the formation of rubbing traces in the method of manufacturing a polarizing lens relating to a third implementation mode of the present invention; A is a top view and B is a lateral view.

FIG. 10 shows the steps of forming rubbing traces based on the present implementation mode. FIG. 10A is a top view during the formation of rubbing traces. FIG. 10B is a lateral view.

As shown in FIG. 10A, substrate 110 is secured on jig 113. As shown in FIG. 10B, rubbing member 115 is secured to rubbing head 114 on the side facing the side of lens substrate 110 on which the orientation layer is formed. Rubbing member 115 is comprised of an elastic material such as a sponge, rubber, or packing, and follows the surface contours of substrate 110.

Rubbing head 114 is connected to shaft 116. At the displacement reference 117 on shaft 116, shaft 116 is connected to a bidirectional drive element 118 such as a biaxial actuator by means of a support column. That is, in this case, bidirectional drive element 118 can displace rubbing member 115, for example, in a direction y1 parallel to shaft 116, and in a direction x1 that is perpendicular to direction y1 and runs along the surface of rubbing member 115.

Accordingly, during the formation of rubbing traces, as shown in FIG. 10B, as needed, rubbing member 115 is contacted with substrate 110 under a desired pressure f as needed and bidirectional drive element 118 is driven to slide rubbing member 115 freely across substrate 110. That is, in the present mode, it is possible to form rubbing traces based on free curves on the orientation layer of substrate 110. The arc-shaped rubbing traces and concentric circular rubbing traces described in the first and second implementation modes above can also be formed.

In this process, a slurry obtained by mixing the above-described abrasives and solvents (pure water, oily solvent, or mixture of pure water and additives or the like) can be employed. Instead of a slurry, a sheet impregnated with an abrasive such as $Al_2O_3$ can be employed in dry processing, or rubbing traces can be formed by feeding pure water or an oil in wet processing.

Thus, since it is possible to form rubbing traces in the form of free curves by the method of manufacturing a polarizing lens based on the present implementation mode, it is possible to form a polarizing lens provided with polarization axes in a desired free axial direction. In the present implementation mode, in particular, since it is possible to form polarization axes as free curves, it is possible to manufacture a polarizing lens that conforms to the surrounding environment so as to block light such as light reflecting off of complex curved surfaces.

The present implementation mode is particularly suited to the use of dichroic dyes that form polarization axes in a direction perpendicular to the rubbing traces formed on the orientation layer. Using such dichroic dyes, for example, in the course of forming arc-shaped and concentric circular polarization axes, using the center of the arcs as the displacement reference, and radially displacing the rubbing member permits the formation of polarizing layers having polarization axes in arc-shaped or concentric circular directions. In the cases of special curves and closed curves such as ellipses, it is similarly possible to form a polarizing layer having a distribution of directions of polarization axes in these shapes by displacing the rubbing member so as to trace paths perpendicular to the curves.

Figure 13:
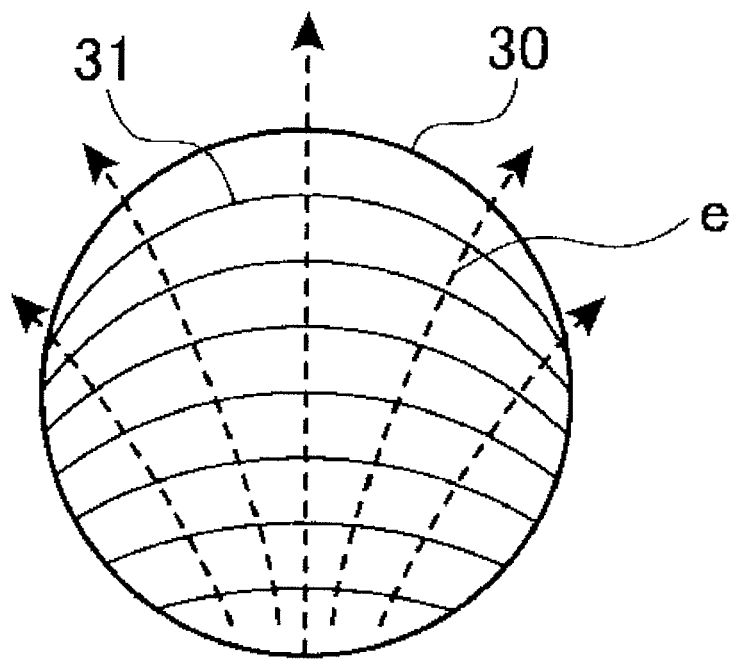
FIG. 13 is an example of the layout of rubbing traces and polarization axes in a method of manufacturing polarizing lenses relating to the third implementation mode of the present invention.
Figure 14:
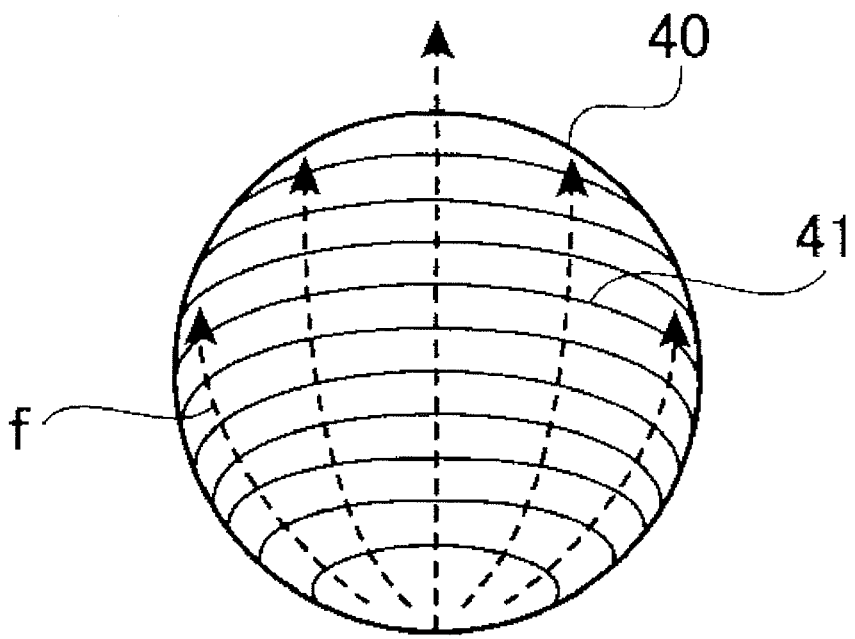
FIG. 14 is an example of the layout of rubbing traces and polarization axes in a method of manufacturing polarizing lenses relating to the third implementation mode of the present invention.

Examples of the disposition of the rubbing traces and polarization axes in the present mode are given in FIGS. 13 and 14. The polarizing lens 30 shown in FIG. 13 has a distribution of polarization axes 31 that is achieved by orienting and depositing a dichroic dye, having the property of forming polarization axes in a direction perpendicular to the rubbing traces, on an orientation layer in which have been formed rubbing traces tracing curved paths that widen to the right and left from bottom to top about an axis of symmetry in the front vertical direction indicated by dotted line e. The polarizing lens 40 shown in FIG. 14 was formed with polarization axes 41 with a targeted elliptical distribution using a dichroic dye having the same property as above after rubbing to form curved paths that were convex to the right and left employing an axis of symmetry in the form of the vertical direction passing through the geometric center in a direction perpendicular to the direction of the desired of polarization axes as indicated by dotted line fin FIG. 14.

6. Examples of Rubbing Trace-Forming Devices

Various examples of rubbing trace-forming devices that can be employed in the method of manufacturing a polarizing lens of the present invention will be described below.

(6-1) First Example of a Rubbing Trace-Forming Device

Figure 11:
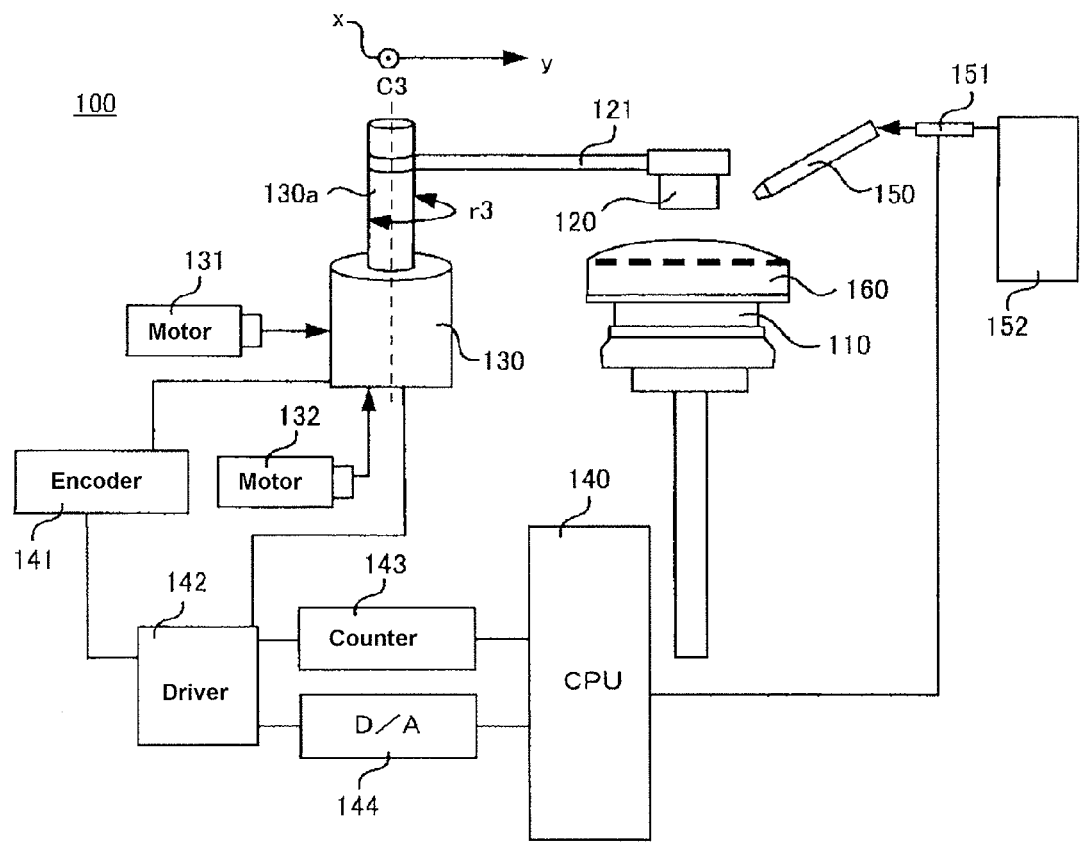
FIG. 11 is a block diagram of an example of a device for forming rubbing traces.

FIG. 11 is a block diagram of rubbing trace-forming device 100 in the present example.

In device 100, jig 110 supporting polarizing lens substrate 160 is positioned opposite rubbing member 120 comprised of an elastic material such as rubber. Substrate 160 is secured on jig 110 facing rubbing member 120 with the surface of the orientation layer facing upward. Rubbing member 120 is secured to the end of shaft 121. For example, the other end of shaft 121 serves as displacement reference C3. That position is connected to shaft 130a of motor 130. Control by driver 142 causes the rotation or revolution of motor 130, rotating rubbing member 120 about displacement reference C3 as a center, thereby displacing rubbing member 120 over a arc-shaped path on substrate 160. At that time, by providing a raising and lowering mechanism (not shown) for adjusting the position where shaft 121 is secured on shaft 130a of motor 130, or the position (height) at which jig 110 holds substrate 160, it is possible to apply suitable pressure to rubbing member 120 during the rubbing step. Pressure sensors, not shown, can also be provided on the head of rubbing member 120.

In this example, a configuration is also possible in which a central processing unit (CPU) 140 that detects the rotational speed and revolution angle of motor 130 is used to control feedback from motor 130. In that case, encoder 141 is connected to motor 130 and driver 142. Counter 143 and D/A converter 144 are also connected to driver 142. Each of these is connected to CPU 140. In this configuration, the rotational speed and revolution angle of motor 130 are detected by encoder 141, or counter 143 counts the number of rotations and revolution angle of motor 130 as detected by the encoder, which are transmitted to CPU 140. CPU 140 sends a control signal to driver 142 via D/A converter 144.

CPU 140 can also be configured to control slurry feeding element 150. In that case, the configuration can be such that valve 151 is provided between slurry feeding element 150 and tank 152 in which the slurry is stored, with CPU 140 controlling valve 151.

In device 100 thus configured, when the formation of rubbing traces begins, CPU 140 opens valve 151, and the slurry that has been stored in tank 152 is fed onto substrate 160 by slurry feeding element 150. A raising and lowering drive element and a pressure sensor, not shown, bring rubbing member 120 into contact with the orientation layer of substrate 160 at a desired pressure. In this process, motor 130 is rotated at some rotational speed, causing rubbing member 120 to revolve as indicated by arrow r3 and slide over the surface of the orientation layer of substrate 160. Thus, arc-shaped rubbing traces can be formed on the orientation layer on substrate 160.

In this device, linear motion motor 131 can be provided in a direction aligned with the direction of extension of shaft 121 in addition to motor 130. In that case, linear motor 131 can displace displacement reference C3 in the y-axis direction to slide it over the entire surface of substrate 160. The positions of rubbing member 120 and jig 110 are desirably set so that the y-axis passes through the geometric center of substrate 160 on jig 110.

Another linear motor 132 can be provided that is perpendicular to the direction of displacement of motor 131 to displace displacement reference C3 along the x-axis direction perpendicular to the direction of displacement by motor 131.

In that case, not just arc-shaped rubbing traces, but also free curve rubbing traces can be formed. The positions of linear motors 131 and 132 can be similarly detected by an encoder, not shown, and feedback control can be conducted by drivers based on the detection signals.

In the case where both linear motors 131 and 132 are provided and displacement reference C3 is displaced, rotation-use motor 130 can be omitted and various curves can be rubbed, including arcs and closed curves. It is also possible for the shape of the rubbing traces to be controlled by motor 130 and either linear motor 131 or 132.

Thus, in rubbing trace-forming device 100 shown in FIG. 11, revolving rubbing member 120 about displacement reference C3 as a center permits the formation of arc-shaped rubbing traces. Further, displacing rubbing member 120 while displacing the position of the displacement reference by linear motors 131 and 132 permits the free formation of rubbing traces in the form of desired curves. Accordingly, it is possible to readily manufacture a polarizing lens provided with polarization axes in various directions of polarization based on use.

(6-2) Second Example of a Rubbing Trace-Forming Device

Figure 12:
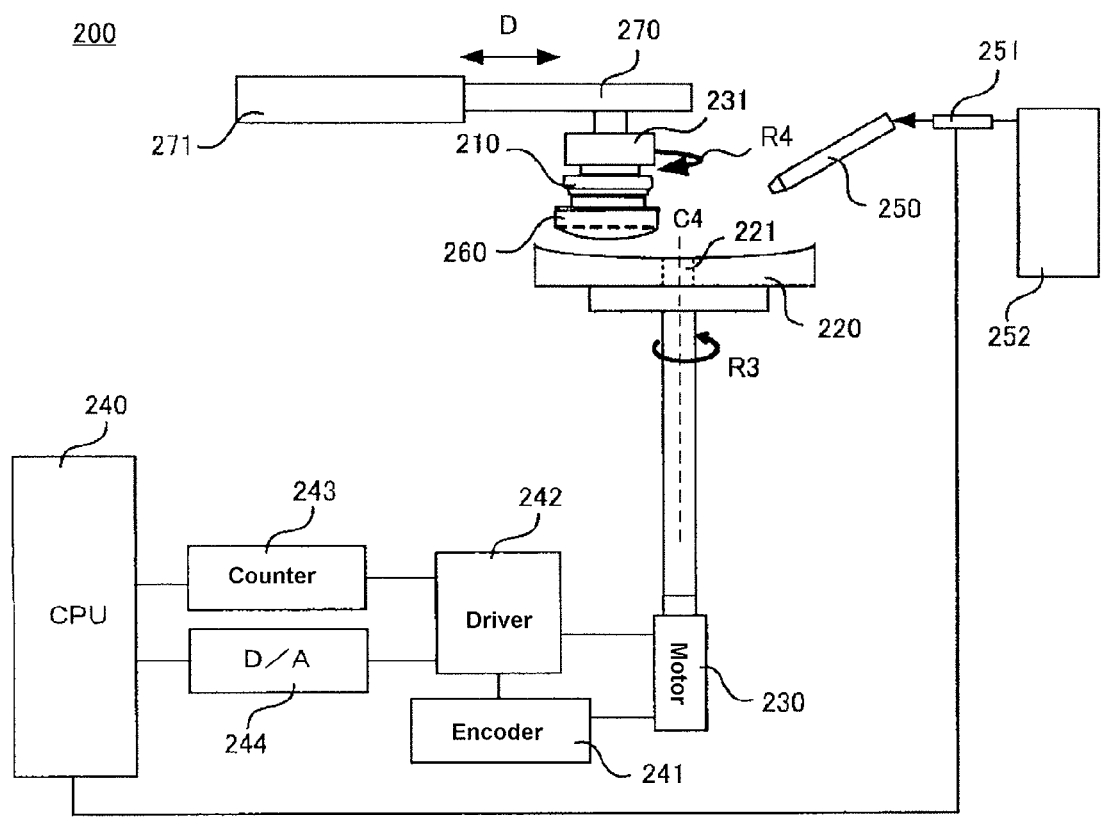
FIG. 12 is a block diagram of another example of a device for forming rubbing traces.

FIG. 12 is a block diagram showing a second example of a rubbing trace-forming device.

Rubbing trace-forming device 200 in the present example is comprised of jig 210 holding substrate 260 facing downward; rod-shaped or the like shaft 270 supporting jig 210; and support member 271 supporting shaft 270 as indicated by arrow D in such a manner as to allow positional adjustment in the direction of extension thereof. Support member 271 can be connected to a raising and lowering drive element, not shown, and a pressure sensor can be connected to jig 210. Additionally, surface plate 220 is disposed facing upward opposite jig 210. Motor 230 rotating surface plate 220 is connected to surface plate 220. In this example, as well, a configuration in which encoder 241 detecting the rotational speed of motor 230 and driver 242 are provided and the rotation of motor 230 is feedback controlled based on a signal detected by encoder 241 is also possible.

In that case, counter 243, counting the number of rotations of motor 230 that is detected by encoder 241, and D/A converter 244, are connected to CPU 240 controlling driver 242.

In this example as in the first example, a configuration is possible in which CPU 240 controls feeding of a slurry. In that case, for example, a configuration is employed in which slurry feeding element 250 is connected to tank 252 through valve 251, and valve 251 is controlled by CPU 240.

To conduct rubbing processing in device 200, substrate 260 is first secured on jig 210 with the surface of the orientation layer facing the surface plate 220 side. The length of shaft 270 holding jig 210 is adjusted to secure substrate 260 at some position relative to surface plate 220, such as the center of rotation of surface plate 220 or a position at a prescribed distance from the center of rotation.

Slurry stored in tank 252 is fed onto surface plate 220 by slurry feeding element 250 by opening valve 251 based on a signal from CPU 240. Next, a raising and lowering drive element and a pressure sensor, not shown, lower substrate 260, contacting it against surface plate 220 at a desired pressure.

The surface of surface plate 220 is comprised of an elastic material such as rubber or packing. The contact surface (sliding surface) with substrate 260 is made concave to subject the entire surface of substrate 260 to uniform pressure. To apply uniform pressure and conduct uniform rubbing processing of the entire surface, it is desirable for the surface of the rubbing member (the surface sliding against the surface of the orientation layer) to be concave when the substrate surface, that is, the surface of the orientation layer, contains a convex surface, as shown in FIG. 12 and other figures. Further, the use of an elastic material with a concave surface sliding against the orientation layer is preferred. Hole 221 is provided in a region containing displacement reference C4, which is the rotational axis, in surface plate 220. A configuration in which this region does not contact substrate 260 can be employed. It is thus possible to obtain a polarizing lens containing a non-polarizing region in the center, as set forth above.

Surface plate 220 is rotated about displacement reference C4 as a center by motor 230 to form rubbing traces on the orientation layer of substrate 260. When the contact surface with substrate 260 contains the region of hole 221, concentric circular rubbing traces are formed. Conversely, when substrate 260 is fixed at a position away from displacement reference C4 and the contact surface with surface plate 220 does not contain the region of hole 221, arc-shaped rubbing traces are formed. Still further, by varying the distance of substrate 260 from displacement reference C4, it is possible to freely select the curvature of the arc-shaped rubbing traces.

When the geometric center of substrate 260 is matched with displacement reference C4, rubbing traces are not formed in the region near the geometric center of substrate 260 due to hole 221.

In this case, as well, the rotational speed of motor 230 is detected by encoder 241, and driver 242 conducts feedback control of motor 230 based on the detection signal. Counter 243 counts the number of rotations of motor 230 and outputs it to CPU 240. The control signal to driver 242 is sent by CPU via D/A converter 244.

In this manner, rubbing trace-forming device 200 of the present example can readily form concentric circular rubbing traces and arc-shaped rubbing traces with good control and in a single step by varying the distance of the substrate from the displacement reference position of the surface plate. Accordingly, it is possible to readily manufacture a polarizing lens having polarization axes in various directions.

When forming concentric circular rubbing traces, a configuration in which the surface plate is secured, motor 231 is connected to jig 210, and motor 231 rotates substrate 260 in the direction of arrow R4 is also possible.

It is also possible for a linear motor to be mounted on shaft 270 and for substrate 260 to be displaced in the direction of extension of shaft 270 as indicated by arrow D based on numeric controls.

EXAMPLES

The present invention will be described in greater detail below through Examples. However, the present invention is not limited to Examples. Evaluation items are as follows:
(1) Polarization efficiency
(2) Transparency (Haze value)
(3) Adhesion
Details of the above items will be described below.
(1) Polarization Efficiency
The polarization efficiency (Peff) was evaluated in accordance with ISO8980-3 by obtaining the parallel transmittance (T//) and vertical transmittance (T⊥) and employing the following equation. The parallel transmittance and vertical transmittance were measured using a visible-light spectrophotometer and a polarizer.

Peff (%)=[(T//−T⊥)/(T//+T⊥)]×100

(2) Transparency (Haze Value)
A hazemeter HM-150 made by Murakami Color Research Laboratory Co., Ltd. was used to measure the haze value of the polarizing lenses that were produced, and the presence or absence of clouding was determined based on the following evaluation scale.
(Evaluation Scale)
○ : No clouding (haze value≦0.4 percent)
X: Clouding present (haze value>0.4 percent)
(3) Adhesion
The adhesive performance of the polarizing lenses that were prepared was evaluated by immersing the polarizing lenses in boiling water for three hours and then subjecting them to a test under the measurement conditions given below.

Crosscuts were made at intervals of 1.5 mm to form 100 squares in a cured film, adhesive tape was firmly applied to the crosscut area, and the adhesive tape was rapidly peeled off. The number of the 100 squares of the cured film that peeled off was counted. The evaluation scale was as follows.
(Evaluation Scale)
⊚ Number of squares that peeled off: 0/100 (no film peeling)
○ Number of squares that peeled off: 1 to 2/100
Δ Number of squares that peeled off: 3 to 5/100
X Number of squares that peeled off: 6 or more/100
Examples and Comparative Example will be described below.

Example 1

Example of Forming Arc-Shaped Polarization Axes (i) Preparation of Orientation Layer Coating Liquid
To 4.9 g of silica sol (methanol solvent, solid component 30 weight percent, average primary particle diameter 12 nm) were sequentially added 29.2 g of ethanol, 10.4 g of tetraethoxysilane (TEOS) (molecular weight 208.3), and 2.1 g of γ-glycidoxypropyltrimethoxysilane (γ-GPS) and the mixture was stirred. Next, 2.9 g of 0.01 mol/L of hydrochloric acid (18.4 mol percent of total quantity of coating liquid) was admixed, after which 0.5 g of aluminum catalyst (aluminum acetyl acetate) (0.18 mol percent of total quantity of coating liquid) was added and thoroughly stirred. The mixture was passed through a 0.5-micrometer filter to obtain an orientation layer coating liquid.
(ii) Formation of Orientation Layer
The above orientation layer coating liquid was spin-coated (dispensed at 800 rpm, maintained for 60 s) onto the concave surface of a polyurethane urea lens substrate (trade name Phoenix, made by Hoya Corp., refractive index 1.53, hard coated, 70 mm diameter, base curve 4) and then cured by thermoprocessing for 1 hour at 85° C. to prepare an orientation layer (sol-gel film) about 150 nm in thickness.
(iii) Forming Rubbing Traces
Rubbing traces were formed with abrasive-containing urethane foam (abrasive: $Al_2O_3$ particles 0.1 to 5 micrometer in average diameter; urethane foam: roughly identical in shape to the curvature of the concave surface of a spherical lens) on the orientation layer obtained.

The processing to form the rubbing traces was conducted for 30 s under a condition of a contact pressure of 50 $g/cm^2$. As indicated in the first implementation mode (FIG. 2), the displacement reference of the head was disposed vertically below when the lens would be worn and the rubbing member was swung in an arc shape across the substrate (surface of the orientation layer) to form arc-shaped rubbing traces on the surface of the orientation layer. The substrate on which the rubbing traces had been formed was washed with pure water and dried.
(iv) Forming a Polarizing Layer
After drying the substrate, 2 to 3 g of a roughly 5 weight percent aqueous solution of dichroic dye was spin coated on the surface on which the rubbing traces had been formed (the surface of the orientation layer) to form a polarizing layer. In the spin coating, the aqueous solution of dye was dispensed at a rotational speed of 300 rpm, maintained for 8 s, dispensed at a rotational speed of 400 rpm, maintained for 45 s, and then dispensed at 1,000 rpm and maintained for 12 s. The polarizing lens during this stage exhibited a polarization efficiency of 99 percent and a transmittance of 30.5 percent. The dichroic dye employed had the property of forming polarization axes along the rubbing traces, so the distribution of the directions of polarization axes in the polarizing layer that was formed was of the arc shape shown in FIG. 3.

Next, an aqueous solution with an iron chloride concentration of 0.15 M, a calcium hydroxide concentration of 0.2 M, and a pH of 3.5 was prepared. The lens obtained was immersed for about 30 s in this aqueous solution, after which it was removed and thoroughly washed with pure water. This step rendered the water-soluble dye highly insoluble.

(v) Forming a Dye-Protecting Film (Processing to Immobilize the Dichroic Dye)

Subsequently, the lens was immersed for 15 minutes in a 10 weight percent aqueous solution of γ-aminopropyltriethoxysilane, washed three times with pure water, and heat cured for 30 minutes at 85° C. After cooling, the lens was immersed for 30 minutes in a 2 weight percent aqueous solution of γ-glycidoxypropyltrimethoxysilane in air, heat cured for 30 minutes in a 100° C. oven, and cooled following curing to form a dye-protecting film (protective layer).

(vi) Forming a Functional Film

The lens on which the dye-protecting film had been formed was polished with an abrasive (average particle diameter 0.8 micrometer) and thoroughly washed. A coating of UV-curable resin was then applied by spin coating (dispensed at 500 rpm, maintained for 45 s). Following the coating, curing was conducted at a UV irradiation level of 600 mJ/cm$^2$ with a UV-irradiating apparatus to form a hard coat on the surface on which the protective layer had been formed.

Example 2

Example of Forming Closed-Curve Polarization Axes

SiO$_2$ was vapor deposited with an electron gun under conditions of a substrate temperature of about 50° C. and a vacuum of about $10^{-5.5}$ MPa on a substrate in the form of the polyurethane urea lens used in Example 1 to form an orientation layer in the form of an SiO$_2$ vapor deposition film (thickness 250 nm).

With the exception that the geometric center of the lens was then positioned on the rotational axis of a surface plate and the surface plate was rotated to form rubbing traces in the form of concentric circles on the orientation layer in the same manner as in the second implementation mode (FIG. 8), processing was conducted by the same methods as in Example 1. The rotational speed of the surface plate was 350 rpm. This yielded a polarizing lens having concentric circular polarization axes, as shown in FIG. 9.

Comparative Example

A substrate was prepared by conducting vapor deposition with an electron gun under conditions of a substrate temperature of about 50° C. and a vacuum of about $10^{-5.5}$ MPa on a substrate in the form of the polyurethane urea lens used in Example 1 to form an orientation layer in the form of an SiO$_2$ vapor deposition film (thickness 250 nm).

Next, rubbing traces were formed on this substrate with an abrasive (Al$_2$O$_3$ particles 0.8, 1.3, or 3 micrometers in average particle diameter). This processing was conducted in the same manner as in Example 1 with the exceptions of employing a polishing pressure of 50 g/cm$^2$ and linearly displacing the rubbing pad for 30 s in a uniaxial direction (the direction was fixed at the vertical direction when wearing the lens). Accordingly, polarization axes of the polarizing lens of Comparative Example were linearly aligned in a uniaxial direction in the same manner as the rubbing traces that were formed.

The polarization efficiency, adhesion, and transparency of the polarizing lens obtained were evaluated. Results are given Table 1 below.

TABLE 1

|  | Example 1 | Example 2 | Comp. Ex. |
|---|---|---|---|
| Polarization efficiency at optical center | 98% | 98% | 98% |
| 45° direction polarization efficiency in 45° upward direction | 98% | 98% | 49% |
| Transparency | ○ | ○ | ○ |
| Adhesion | ◎ | ◎ | ◎ |

High polarization efficiency at the optical center of 98 percent was exhibited by Examples 1 and 2 and Comparative Example. This satisfied the general polarizing lens guideline of a polarization efficiency of 50 percent. Adequate transparency and adhesion were ensured in Examples 1 and 2 and in Comparative Example.

When light polarized to a direction of 45 degrees entered from above in diagonal directions of 45 degrees (the directions of 1:30 and 10:00), the polarization efficiency of Comparative Example was 49 percent, representing a decrease to one half the polarization efficiency of the optical center. This was also below the 50 percent value of the guidelines.

In contrast, Examples 1 and 2 exhibited polarization efficiencies of 98 percent for these directions, indicating a light-blocking ability equivalent to that at the optical center.

The polarizing lens of Comparative Example only had horizontal axes of polarization. Thus, it was unable to completely block 45 degree polarized light entering from above at an angle of 45 degrees, and could only block about half of such light. In contrast, the polarizing lenses of Examples 1 and 2 had polarization axes that changed continuously in an axial direction. Thus, they were able to adequately block 45 degree polarized light entering from above at an angle of 45 degrees. Thus, eyeglasses employing the lenses of Examples 1 and 2 can block light reflecting off of surrounding buildings when the sun is shining diagonally from above, for example, and can eliminate much of the cause of the glare experienced due to reflected light.

When the displacement reference of sliding in Example 1 is positioned vertically above when wearing the lens, the distribution of the directions of polarization axes in the polarizing layer that is formed is an arc shape, as shown in FIG. 4. Thus, it is possible to block 45 degree polarized light entering from below at an angle of 45 degrees. Since polarization axes with continuously changing axial directions are present, polarized light entering from below at other angles can also be blocked. Accordingly, the lens is suited to prevent reflection from the surface of water, for example, and when employed as an eyeglass lens for leisure activities and the like near water, it is extremely useful for preventing glare.

Description of the numbers in the drawings are as follows:
1, 10, 20, 30, 40, 50: Substrates; 2: hard coat layer; 3: primer layer; 4: orientation layer; 5: Rubbing trace, 6: polarizing layer; 7: protective layer; 8: functional film; 31, 41, 51: surface plates; 32, 42, 52: slurry feeding elements; 13, 23, 43, 53: jigs; 14, 24: heads; 15, 25: rubbing members; 16, 26, 46: shafts; 17, 27, 47: displacement references; 58: hole; 60, 70, 80: polarizing lenses; 61, 71, 81: polarization axes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing a polarizing eyeglass lens comprising:
    forming an orientation layer on a substrate;
    sliding a rubbing member across the orientation layer in a state of contact with the orientation layer to form curved rubbing traces on a surface of the orientation layer;
    forming a polarizing layer by depositing and orienting a dichroic dye on the orientation layer; and
    subjecting the polarizing layer to a treatment of immobilizing the dichroic dye in the polarizing layer;
    wherein the curved rubbing traces are formed by securing one of the rubbing member and the substrate and sliding the other of the two using a displacement reference at a given position as a center of revolution with the rubbing member in a state of contact with the orientation layer, and
    wherein the displacement reference is positioned vertically beneath or above a geometric center of the substrate when the lens is being worn.

2. The method of manufacturing a polarizing eyeglass lens according to claim 1, wherein one of the rubbing member and the substrate slides while tracing an arc-shaped path using the displacement reference as a center of revolution.

3. The method of manufacturing a polarizing eyeglass lens according to claim 1, wherein one of the rubbing member and the substrate slides while rotating around the displacement reference as a center of revolution.

4. The method of manufacturing a polarizing eyeglass lens according to claim 1, wherein the displacement reference is positioned vertically beneath the geometric center of the substrate when the lens is being worn.

5. The method of manufacturing a polarizing eyeglass lens according to claim 1, wherein the displacement reference is positioned vertically above the geometric center of the substrate when the lens is being worn.

6. The method of manufacturing a polarizing eyeglass lens according to claim 4, wherein the displacement reference is positioned on a vertical line running through the geometric center of the substrate.

7. The method of manufacturing a polarizing eyeglass lens according to claim 5, wherein the displacement reference is positioned on a vertical line running through the geometric center of the substrate.

8. The method of manufacturing a polarizing eyeglass lens according to claim 1, wherein a non-contact region in which there is no contact between the rubbing member and the orientation layer is provided in a region containing a geometric center of the substrate.

9. The method of manufacturing a polarizing eyeglass lens according to claim 8, wherein the non-contact region has an outer diameter of equal to or greater than 4 mm but equal to or less than 15 mm.

10. The method of manufacturing a polarizing eyeglass lens according to claim 1, wherein the curved rubbing traces are formed by relatively displacing either the rubbing member or the substrate in two or more different directions by sliding with the rubbing member in a state of contact with the orientation layer.

11. The method of manufacturing a polarizing eyeglass lens according to claim 1, wherein the orientation layer in the form of a sol-gel film is formed.

12. The method of manufacturing a polarizing eyeglass lens according to claim 1, wherein the rubbing member is an elastic member with a concave surface sliding against the orientation layer.

* * * * *